(12) United States Patent
Xu

(10) Patent No.: US 11,460,176 B2
(45) Date of Patent: Oct. 4, 2022

(54) INTEGRAL CONTROL SYSTEM FOR GALVANOMETER LASER LAMP

(71) Applicant: Peijian Xu, Guangzhou (CN)

(72) Inventor: Peijian Xu, Guangzhou (CN)

(*) Notice: Subject to any disclaimer, the term of this patent is extended or adjusted under 35 U.S.C. 154(b) by 0 days.

(21) Appl. No.: 17/579,572

(22) Filed: Jan. 19, 2022

(65) Prior Publication Data

US 2022/0146082 A1 May 12, 2022

(51) Int. Cl.
*F21V 21/15* (2006.01)
*F21V 23/00* (2015.01)
*F21V 29/61* (2015.01)

(52) U.S. Cl.
CPC ............ *F21V 21/15* (2013.01); *F21V 23/003* (2013.01); *F21V 29/61* (2015.01)

(58) Field of Classification Search
CPC ......... F21V 21/15; F21V 29/61; F21V 23/003
USPC ........................................................ 362/214
See application file for complete search history.

(56) References Cited

U.S. PATENT DOCUMENTS

| | | | |
|---|---|---|---|
| 2017/0114992 A1* | 4/2017 | Dodworth | F21V 23/0457 |
| 2018/0106451 A1 | 4/2018 | Lee et al. | |
| 2019/0024862 A1* | 1/2019 | Kurashige | H01S 5/0071 |
| 2019/0249847 A1* | 8/2019 | Hallack | F21V 23/0442 |
| 2019/0316883 A1* | 10/2019 | Poplawski | F21V 23/0414 |
| 2020/0132269 A1 | 4/2020 | Belcher et al. | |
| 2020/0173631 A1* | 6/2020 | March | F21S 8/063 |
| 2020/0378577 A1* | 12/2020 | Murakami | F21S 41/675 |
| 2021/0003265 A1 | 1/2021 | Alisafaee | |
| 2022/0146082 A1* | 5/2022 | Xu | F21V 29/61 |

* cited by examiner

*Primary Examiner* — Bryon T Gyllstrom
(74) *Attorney, Agent, or Firm* — Zhihua Han

(57) ABSTRACT

The disclosure provides an integral control system for a galvanometer laser lamp. The system includes an integral control and drive device, a power source, and a plurality of component parts. The integral control and drive device includes a drive board, a galvanometer control module, and a laser control module. The component parts include a galvanometer motor and a laser that are respectively connected to the galvanometer control module and the laser control module. This optimizes the volume of the integral control and drive device and improves wiring between the modules, effectively reduces the volume of the entire system, and lowers the transportation and mounting costs.

6 Claims, 1 Drawing Sheet

INTEGRAL CONTROL SYSTEM FOR GALVANOMETER LASER LAMP

TECHNICAL FIELD

The present disclosure relates to the technical field of galvanometer lasers, and in particular, relates to an integral control system for a galvanometer laser lamp.

BACKGROUND

A galvanometer system is a high-precision and high-seed servo control system composed of a drive board and a high-speed swing motor, which is widely applied to such fields as laser material processing, biomedical detection, image and pattern processing, and stage lighting. A conventional galvanometer laser lamp used in stage performance mainly includes a galvanometer, a laser, a galvanometer drive board, a laser drive board, and the like separate components. The conventional galvanometer laser lamp at least needs two separate power sources to supply power to the components inside the machine. Under such circumstances, more space needs to be reserved inside the machine for accommodation of different power sources. This causes difficulties to layout and design, but also causes an excessively large size and weight of the machine, such that stricter requirements are imposed on the actual mounting position, load carrying capacity, and the like. Consequently, the cost of the machine is increased. Second, since a plurality of separate components are deployed, extra connection wires are needed between the components. With increase of the number of modules, the number of wire groups is also increased. As a result, the difficulty in manufacturing connection wires in the early stage is high, and maintenance and inspection in the future are more complicated.

SUMMARY

In view of the defect in the related art, an object of the present disclosure is to provide an integral control system for a galvanometer laser lamp featuring reasonable structure, small volume, and convenient manufacturing.

To achieve the above object, the present disclosure employs the following technical solution. An integral control system for a galvanometer laser lamp includes: an integral control and drive device, a power source, and a plurality of component parts; wherein the integral control and drive device comprises a drive board, and a galvanometer control module and a laser control module that are integrated on the same drive board, the power source is connected to the integral control and drive device, and is configured to supply power to the integral control and drive device and the component parts connected to the integral control and drive device, and the component parts comprise a galvanometer motor and a laser that are respectively electrically connected to the galvanometer control module and the laser control module, wherein in response to a control instruction from an external signal source, the integral control and drive device correspondingly conduct at least one action of controlling the galvanometer motor by the galvanometer control module and controlling the laser by the laser control module.

Further, the component parts further include a signal input terminal board; wherein the signal terminal board is configured to receive the control instruction from the external signal source and transmit the control instruction to the integral control and drive device.

Further, the galvanometer control module includes a galvanometer motion drive module and a galvanometer signal processing module; wherein the galvanometer motion drive module is connected to the galvanometer signal processing module, the galvanometer signal processing module is configured to receive the control instruction and convert the control instruction to a corresponding galvanometer instruction and transmit the galvanometer instruction to the galvanometer motion drive module, and the galvanometer motion drive module is connected to the galvanometer motor and is configured to control a motion state of the galvanometer motor.

Further, the laser control module includes a laser power drive module and a laser signal processing module; wherein the laser power drive module is connected to the laser signal processing module, the laser signal processing module is configured to receive the control instruction, convert the control instruction to a corresponding laser instruction, and transmit the laser instruction to the laser power drive module, and the laser power drive module is connected to the laser and is configured to control a laser state of the laser.

Further, the integral control and drive device further includes a micro processing control module; wherein an acquisition terminal of the micro processing control module is connected to the galvanometer motor and the laser, a control terminal of the micro processing control module is connected to the galvanometer control module and the laser control module, the micro processing control module is configured to monitor and identify operating condition information of the galvanometer motor and the laser, such that the micro processing control module transmits a corresponding protection instruction to the galvanometer control module and the laser control module in response to any one of the galvanometer motor and the laser being abnormal, such that the galvanometer motor and the laser are both switched to a suitable state.

Further, the integral control and drive device further includes a heat dissipation control module, and the component parts further include a heat dissipation fan connected to the heat dissipation control module.

The present disclosure achieves the following beneficial effects: By integrating various modules of the integral control and drive device on the same drive board, the volume of the integral control and drive device is optimized, and the wiring between the various modules is improved; and by supplying power to the integral control and drive device and various component parts by using a single power source, the volume of the entire system is effectively reduced, and the transportation and mounting costs are lowered.

BRIEF DESCRIPTION OF THE DRAWINGS

For clearer descriptions of the technical solutions in the embodiments of the present disclosure or in the related art, hereinafter, drawings that are to be referred for description of the embodiments or the related art are briefly described. Apparently, the drawings described hereinafter merely illustrate some embodiments of the present disclosure. Persons of ordinary skill in the art may also derive other drawings based on the drawings described herein without any creative effort.

Figure 1:
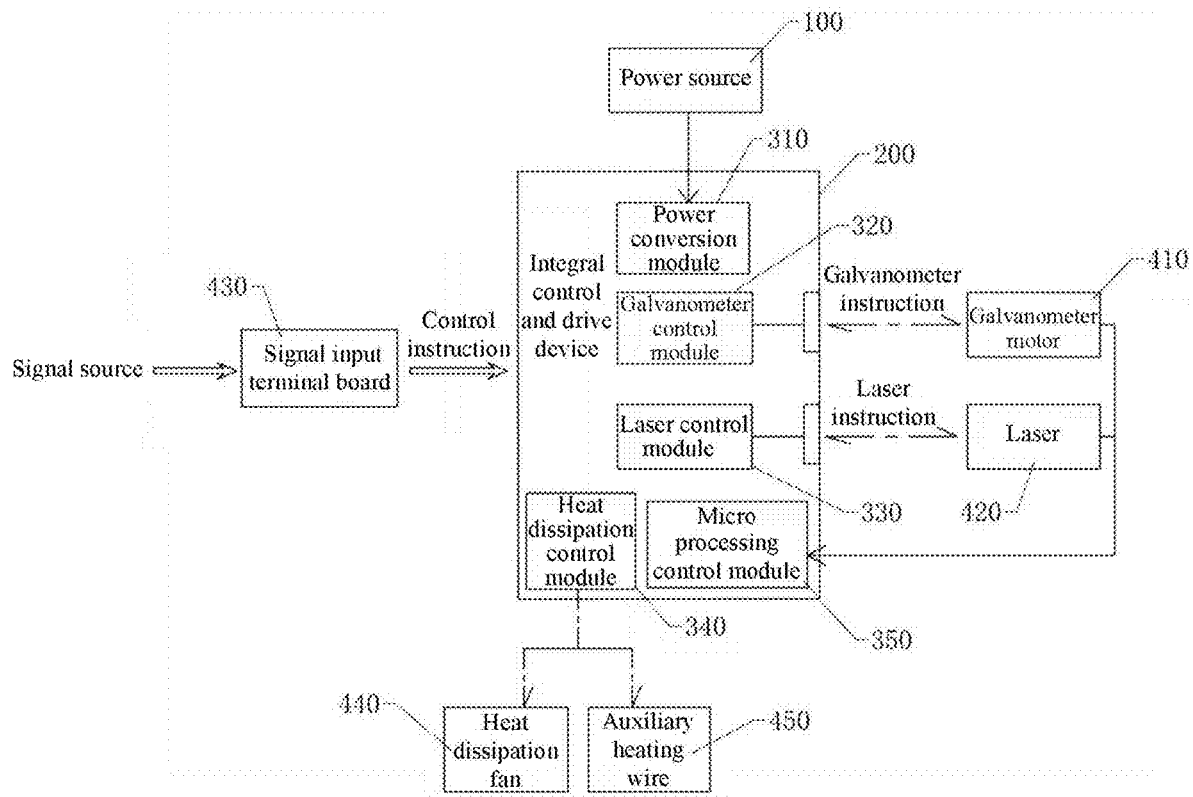
FIG. 1 is a schematic structural view of an integral control system.

Reference numerals and denotations thereof: 100—power source, 200—drive board, 310—power source conversion module, 320—galvanometer control module, 321—galvanometer signal processing module, 322—galvanometer motion drive module, 330—laser control module, 331—laser signal processing module, 332—laser power drive module, 340—heat dissipation control module, 350—micro processing control module, 410—galvanometer motor, 420—laser, 430—signal input terminal board, 440—heat dissipation fan, and 450—auxiliary heating wire.

DETAILED DESCRIPTION

The technical solutions in the embodiments of the present disclosure are described in detail clearly and completely hereinafter with reference to the accompanying drawings for the embodiments of the present disclosure. Apparently, the described embodiments are only a portion of embodiments of the present disclosure, but not all the embodiments of the present disclosure. Based on the embodiments of the present disclosure, all other embodiments derived by persons of ordinary skill in the art without any creative efforts shall fall within the protection scope of the present disclosure.

Figure 2:
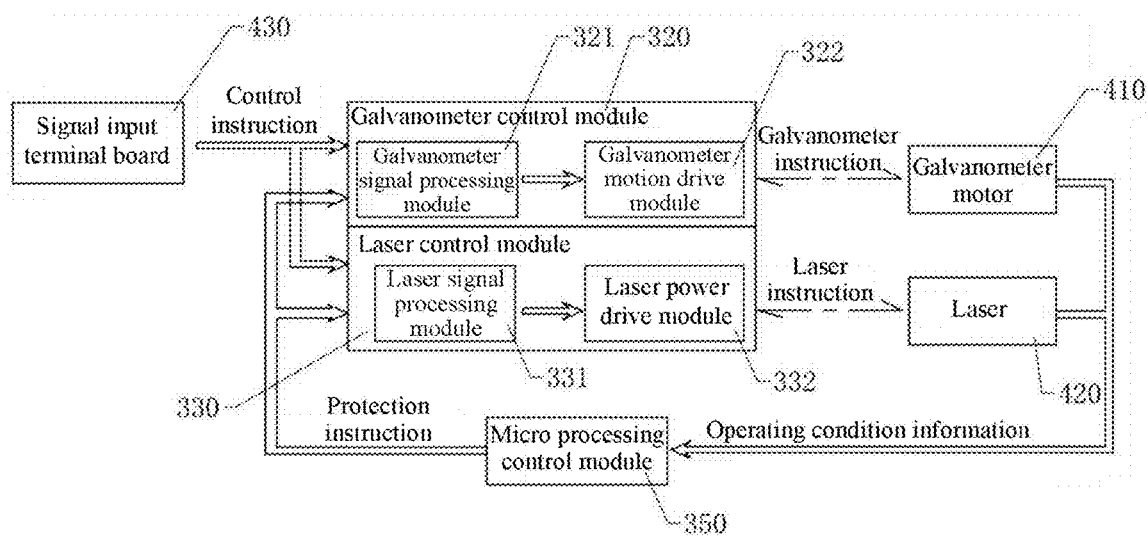
FIG. 2 is a schematic diagram of a galvanometer control module and a laser control module.

Referring to FIG. 1 and FIG. 2, in this embodiment, an integral control system for a galvanometer laser lamp includes an integral control and drive device, a power source 100, and component parts. The integral control and drive device includes a galvanometer control module 320 and a laser control module 330 that are integrated on a same drive board 200. In this embodiment, the power source 100 employs a 24 V voltage. The power source 100 is connected to the integral control and drive device, such that the power source 100 supplies power to the integral control and drive device and various component parts connected to the integral control and drive device. In this way, by supplying power to the integral control and drive device and to the various component parts in directly via the integral control and drive device by the single power source 100, the conventional structure configured with a plurality of power sources 100 may be improved, such that the volume of the system is reduced and the cost of the system is lowered.

In this embodiment, the component parts include a signal input terminal board 430, a galvanometer motor 410, and a laser 420. The galvanometer motor 410 and the laser 420 are respectively electrically connected to the galvanometer control module 320 and the laser control module 330. Specifically, connection ports are pre-configured on the drive board 200, such that the galvanometer motor 410 and the laser 420 are connected via the connection ports, and the connection ports are electrically connected to the galvanometer control module 320 and the laser control module 330 via pre-configured connection circuits. In this way, the galvanometer control module 320 and the laser control module 330 are respectively communicably connected to the galvanometer motor 410 and the laser 420. The galvanometer control module 320 is configured to control an operating state of the galvanometer motor 410, and the laser control module 330 is configured to control a laser state of the laser 420. In this way, the integral control and drive device correspondingly conduct at least one action of controlling the galvanometer motor 410 by the galvanometer control module 320 and controlling the laser 420 by the laser control module 330.

Specifically, the signal input terminal board 430 is connected to the connection board pre-configured on the drive board 200 of the integral control and drive device via a signal bus. The signal input terminal board 430 is configured with an ILDA interface for connecting an external signal source, such that the control instruction of the external signal source is transmitted through the signal input terminal board 430 to the integral control and drive device. In this way, the galvanometer control module 320 controls the galvanometer motor 410 to operate, or the laser control module 330 controls the laser 420 to operate, or the galvanometer control module 320 controls the galvanometer motor 410 to operate while the laser control module 330 controls the laser 420 to operate.

As illustrated in FIG. 1, in this embodiment, the galvanometer control module 320 includes a galvanometer motion drive module 322 and a galvanometer signal processing module 321. The galvanometer motion drive module 322 is connected to the galvanometer signal processing module 321. The galvanometer signal processing module 321 is configured to receive a control instruction, convert the control instruction to a corresponding galvanometer instruction, and transmit the galvanometer instruction to the galvanometer motion drive module 322. The galvanometer signal processing module 321 receives the control instruction from an external signal source via a connection port. The galvanometer motion drive module 322 is connected to the galvanometer motor 410, and is configured to control a motion state of the galvanometer motor 410. Specifically, the galvanometer motion drive module 322 correspondingly controls, an X-axis motor and a Y-axis motor of the galvanometer motor 410 based on the galvanometer instruction, such that the motion state of the galvanometer motor 410 is adjusted.

As illustrated in FIG. 1, in this embodiment, the laser control module 330 includes a laser power drive module 332 and a laser signal processing module 331. The laser power drive module 332 is connected to the laser signal processing module 331. The laser signal processing module 331 is configured to receive a control instruction, convert the control instruction to a corresponding laser instruction, and transmit the laser signal to the laser power drive module 332. The laser signal processing module 331 receives the control instruction from an external signal source via a connection port. The laser power drive module 332 is connected to the laser 420, and is configured to control a laser state of the laser 420. Specifically the laser power drive module 332 correspondingly controls a turn-on or turn-off action and an output power of the laser 420 based on the laser instruction, such that the laser state of the laser 420 is adjusted.

The conventional galvanometer motion drive module 322 fails to acquire in real time operating condition information of the galvanometer motor 410, and the conventional laser power drive module 332 fails to acquire in real time operating condition information of the laser 420. Damage of the galvanometer motor 410 due to overload caused due to the fact that the galvanometer motion drive module 322 fails to effectively control the operation of the galvanometer motor 410 in a timely fashion frequently occurs, and damage of the laser 420 due to overload caused due to the fact the laser power drive module 332 fails to effectively control the operation of the laser 420 in a timely fashion are frequently caused. Accordingly, the integral control and drive device according to this embodiment further includes a micro processing control module 350. An acquisition terminal of the micro processing control module 350 is connected to both the galvanometer motor 410 and the laser 420. Specifically, the acquisition terminal of the micro processing control module 350 is led out via a connection circuit to the connection ports pre-configured on the drive board such that the galvanometer motor 410 and the laser 420 are connected via the connection ports. On the drive board, a control terminal of the micro processing control module 350 is electrically connected to the galvanometer control module 320 and the laser control module 330 via connection circuits. By monitoring and identifying operating condition information of the galvanometer motor 410 and the laser 420, the micro processing control module 350 transmits a corresponding protection instruction to the galvanometer control module 320 and the laser control module 330 in response to any one of the galvanometer motor 410 and the laser 420 being abnormal, such that the galvanometer motor 410 and the laser 420 are both switched to a suitable state.

Specifically, with respect to the galvanometer motor 410, the micro processing control module 350 may monitor and acquire an output current, an operating temperature, a reflective sheet position, and the like parameters of the galvanometer motor 410, and determine, by virtue of a weighting algorithm, a position comparison, or the like, a current range, a temperature range, and a position range satisfying requirements, such that the micro processing control module 350 detects and identifies in real time an abnormality of the galvanometer motor 410. With respect to the laser 420, based on an operating temperature, an output power, and the like parameters of the laser 420, the micro processing control module 350 may determine, by virtue of a weighting algorithm or the like, a current range and a power range satisfying requirements, such that the micro processing control module 350 detects and identifies in real time an abnormality of the laser 420. Once any one of the galvanometer motor 410 and the laser 420 is abnormal, a protection mechanism is triggered, and the micro processing control module 350 transmits a corresponding protection instruction to the galvanometer control module 320 and the laser control module 330, such that the galvanometer motor 410 and the laser 420 are both switched to a suitable state.

For ease of understanding of the micro processing control module 350, hereinafter further description is given with reference to specific embodiments. Where the galvanometer motor 410 encounters an abnormality such as excessively high temperature or current overload of current during operation, the micro processing control module 350 transmits the protection instruction to the galvanometer control module 320 and the laser control module 330, such that the galvanometer motion drive module 322 controls the galvanometer motor 410 to reduce their output powers by 50%, 30%, 1%, and the like progressively; and meanwhile, the laser power drive module 332 controls the laser 420 to reduce the output power by 50%, 30%, 1%, and the like progressively. In this way, the galvanometer motor 410 and the laser 420 gradually resume to their normal states. Where the galvanometer motor 410 encounters an abnormality of overrun of the reflective sheet position during operation, the galvanometer motion drive module 322 controls the galvanometer motor 410 to reset; and meanwhile, the laser power drive module 332 controls the laser 420 to be turned off. In this way, the galvanometer motor 410 and the laser 420 gradually resume to their initial states. Where the galvanometer motor 420 encounters an abnormality such as excessively high temperature or overload during operation, the laser power drive module 332 controls the laser 420 to reduce the output power by 50%, 30%, 1%, and the like progressively, or turns off the laser 420; and meanwhile, the galvanometer motion drive module 322 controls the galvanometer motor 410 to reset. In this way, the galvanometer motor 410 and the laser 420 gradually resume to their normal states. During practical operation, the protection mechanism is configured and triggered as necessary according to actual conditions or operating requirements of the product to control the galvanometer motor 410 and the laser 420, such that the galvanometer motor 410 and the laser 420 are both switched to suitable states. In this way, a protection effect is achieved, and lifetime of the system is effectively prolonged.

In this embodiment, the integral control and drive device further includes a heat dissipation control module 340, and the component parts further include a heat dissipation fan 440 and an auxiliary heating wire 450 that are connected to the heat dissipation control module 340. In this way, a control terminal of the heat dissipation module is connected to both the heat dissipation fan 440 and the auxiliary heating wire 450. An acquisition terminal of the heat dissipation control module 340 may monitor in real time temperatures inside a machine by virtue of a pre-configured temperature sensor, such that whether excessively high temperature or excessively low temperature is present inside the machine is determined. In this way, the heat dissipation fan 440 or the heating wire is correspondingly controlled. Specifically, where the temperature inside the machine is excessively high and heat dissipation needs to be enhanced, the heat dissipation control module 340 controls the heat dissipation fan 440 to start or increase rotation speed, such that the heat inside the machine is exhausted. On the contrary, where the temperature inside the machine is excessively low, the heat dissipation control module 340 controls the auxiliary heating wire 450 to start heating to achieve an auxiliary heating effect, such that the machine operates under normal operating temperatures, which is suitable to low temperature scenarios in winter.

Since operating voltages of the integral control and drive device and the various component parts are partially different, the integral control and drive device further includes a power conversion module 310 integrated on the same drive board 200. The power conversion module 310 is connected to the power source 100 via a 24 V input port, and is provided with a plurality of output ports with different voltage values for connections by various modules and component parts, which is not limited herein. Configurations and connections may be made according to actual needs.

The galvanometer control module 320, the laser control module 330, the heat dissipation control module 340, and the power conversion module 310 of the integral control and drive device are integrated on the same drive board 200, and connection circuits between various modules on the same drive board 200 may be configured on the drive board 200, with no need of excessive wirings and connections. Second, the various modules and component parts are connected via the connection ports pre-configured on the drive board 200, such that the connection wires are standardized, and assembling operations are facilitated. The various modules and various component parts are power supplied by the single power source 100, such that the volume of the integral control system is greatly reduced, and the inner layout space is greatly optimized such that the inner structure is more compact, the entire volume is even smaller, and the transportation cost is lowered. In addition, the integral structure facilitates manufacture of the connection wires and data acquisition and monitoring.

Further, the above connection circuits may be formed on the drive board 200 by etching, and the structure and principle of the circuits are common knowledge, which is not described herein any further.

Signal transmission circuits for, such as communication and transmission, and data interactions, such as monitoring, determination, control, and instructions between the various modules and various component parts all fall within the category of computer programs, and relates to processors and software programs of computers, which are not described and defined any further. The structure and principle of the circuits and the interactions are common technical means in the art for a person skilled in the art. Second, the processors involved in the various modules may employ any one of a dedicated computer, a computer system (including, for example, a micro computer, a small-sized computer or host, a programming micro processor, and a micro controller), a peripheral integrated circuit element, a customer-specific integrated circuit (CSIC), or a application-specific integrated circuit (ASIC), or any other integrated circuit, logic circuit, digital signal processor, a programmable logic device (such as an FPGA, a PLD, a PLA, or a PAL), or any other device or device configuration capable of performing the steps of the process of the present disclosure.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the claims.

What is claimed is:

1. An integral control system for a galvanometer laser lamp, comprising: an integral control and drive device, a power source (100), and a plurality of component parts; wherein the integral control and drive device comprises a drive board (200), and a galvanometer control module (320) and a laser control module (330) that are integrated on the same drive board (200), the power source (100) is connected to the integral control and drive device, and is configured to supply power to the integral control and drive device and the component parts connected to the integral control and drive device, and the component parts comprise a galvanometer motor (410) and a laser (420) that are respectively electrically connected to the galvanometer control module (320) and the laser control module (330), wherein in response to a control instruction from an external signal source, the integral control and drive device correspondingly conduct at least one action of controlling the galvanometer motor (410) by the galvanometer control module (320) and controlling the laser (420) by the laser control module (330).

2. The integral control system according to claim 1, wherein the component parts further comprise a signal input terminal board (430); wherein the signal terminal board (430) is configured to receive the control instruction from the external signal source and transmit the control instruction to the integral control and drive device.

3. The integral control system according to claim 1, wherein the galvanometer control module (320) comprises a galvanometer motion drive module (322) and a galvanometer signal processing module (321); wherein the galvanometer motion drive module (322) is connected to the galvanometer signal processing module (321), the galvanometer signal processing module (321) is configured to receive the control instruction, convert the control instruction to a corresponding galvanometer instruction and transmit the galvanometer instruction to the galvanometer motion drive module (322), and the galvanometer motion drive module (322) is connected to the galvanometer motor (410) and is configured to control a motion state of the galvanometer motor (410).

4. The integral control system according to claim 1, wherein the laser control module (330) comprises a laser power drive module (332) and a laser signal processing module (331); wherein the laser power drive module (332) is connected to the laser signal processing module (331), the laser signal processing module (331) is configured to receive the control instruction, convert the control instruction to a corresponding laser instruction, and transmit the laser instruction to the laser power drive module (332), and the laser power drive module (332) is connected to the laser (420) and is configured to control a laser state of the laser (420).

5. The integral control system according to claim 1, wherein the integral control and drive device further comprises a micro processing control module (350); wherein an acquisition terminal of the micro processing control module (350) is connected to the galvanometer motor (410) and the laser (420), a control terminal of the micro processing control module (350) is connected to the galvanometer control module (320) and the laser control module (330), the micro processing control module (350) is configured to monitor and identify operating condition information of the galvanometer motor (410) and the laser (420), such that the micro processing control module (350) transmits a corresponding protection instruction to the galvanometer control module (320) and the laser control module (330) in response to any one of the galvanometer motor (410) and the laser (420) being abnormal, such that the galvanometer motor (410) and the laser (420) are both switched to a suitable state.

6. The integral control system according to claim 1, wherein the integral control and drive device further comprises a heat dissipation control module (340), and the component parts further comprise a heat dissipation fan (440) connected to the heat dissipation control module (340).

* * * * *